(12) United States Patent
Wan et al.

(10) Patent No.: US 9,065,204 B2
(45) Date of Patent: Jun. 23, 2015

(54) SMART CARD SECURING MECHANISM AND ELECTRONIC DEVICE USING SAME

(71) Applicants: SHENZHEN FUTAIHONG PRECISION INDUSTRY CO., LTD., Shenzhen (CN); FIH (Hong Kong) Limited, Kowloon (HK)

(72) Inventors: Bai-Hang Wan, Shenzhen (CN); Hua-Feng Hao, Shenzhen (CN)

(73) Assignees: SHENZHEN FUTAIHONG PRECISION INDUSTRY CO., LTD., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 14/071,839

(22) Filed: Nov. 5, 2013

(65) Prior Publication Data

US 2015/0004823 A1    Jan. 1, 2015

(30) Foreign Application Priority Data

Jun. 26, 2013 (CN) .......................... 2013 1 0258696

(51) Int. Cl.
*H01R 24/00* (2011.01)
*H01R 13/62* (2006.01)

(52) U.S. Cl.
CPC ...................................... *H01R 13/62* (2013.01)

(58) Field of Classification Search
CPC ............. H01R 13/518; H01R 2103/00; H01R 23/7068; H01R 23/7073; G06K 7/0021; G06K 13/08
USPC ............ 439/159, 188, 540.1, 541.5, 630, 631
See application file for complete search history.

(56) References Cited

U.S. PATENT DOCUMENTS

| | | | | |
|---|---|---|---|---|
| 5,823,828 A * | 10/1998 | Bricaud et al. | ................ | 439/630 |
| 6,468,101 B2 * | 10/2002 | Suzuki | ......................... | 439/326 |
| 7,338,326 B2 * | 3/2008 | Su | ................ | 439/638 |
| 7,351,109 B2 * | 4/2008 | Wang | ............................ | 439/631 |
| 7,361,056 B1 * | 4/2008 | Liu | ................ | 439/630 |
| 7,530,852 B2 * | 5/2009 | Hu et al. | ....................... | 439/630 |
| 7,938,656 B2 * | 5/2011 | Hu | ................ | 439/159 |
| 7,946,876 B1 * | 5/2011 | Huang | ......................... | 439/329 |
| 8,070,521 B2 * | 12/2011 | Li | ................ | 439/631 |
| 8,113,886 B2 * | 2/2012 | Jung et al. | ..................... | 439/630 |
| 8,419,478 B2 * | 4/2013 | Liu et al. | ...................... | 439/631 |
| 8,608,511 B2 * | 12/2013 | Zhang | ........................... | 439/630 |
| 8,870,584 B2 * | 10/2014 | Ma | ................ | 439/159 |

* cited by examiner

*Primary Examiner* — Thanh Tam Le

(74) *Attorney, Agent, or Firm* — Novak Druce Connolly Bove + Quigg LLP

(57) ABSTRACT

A smart card securing mechanism for securing a first smart card and a second smart card includes a base, a first latching member, a second latching member, and an elastic sheet. The base includes a first connector. The first latching member is positioned on one side of the base. The second latching member includes a second connector and is positioned on another side of the base. The elastic sheet is mounted to the base. The first smart card is received in a space defined between the base and the first latching member. The second smart card is received in a space defined between the base and the second latching member. The elastic sheet abuts against the second smart card.

9 Claims, 4 Drawing Sheets

SMART CARD SECURING MECHANISM AND ELECTRONIC DEVICE USING SAME

BACKGROUND

1. Technical field

The disclosure generally relates to smart card securing mechanisms of electronic devices.

2. Description of the Related Art

Often times, users may need to use two different smart cards (such as a SIM card or a memory card) in an electronic device. However, dual card securing mechanisms typically take up a large space of the electronic device.

Therefore, there is room for improvement within the art.

BRIEF DESCRIPTION OF THE DRAWINGS

Many aspects of an exemplary smart card securing mechanism can be better understood with reference to the following drawings. The components in the drawings are not necessarily drawn to scale, the emphasis instead being placed upon clearly illustrating the principles of the exemplary smart card securing mechanism. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
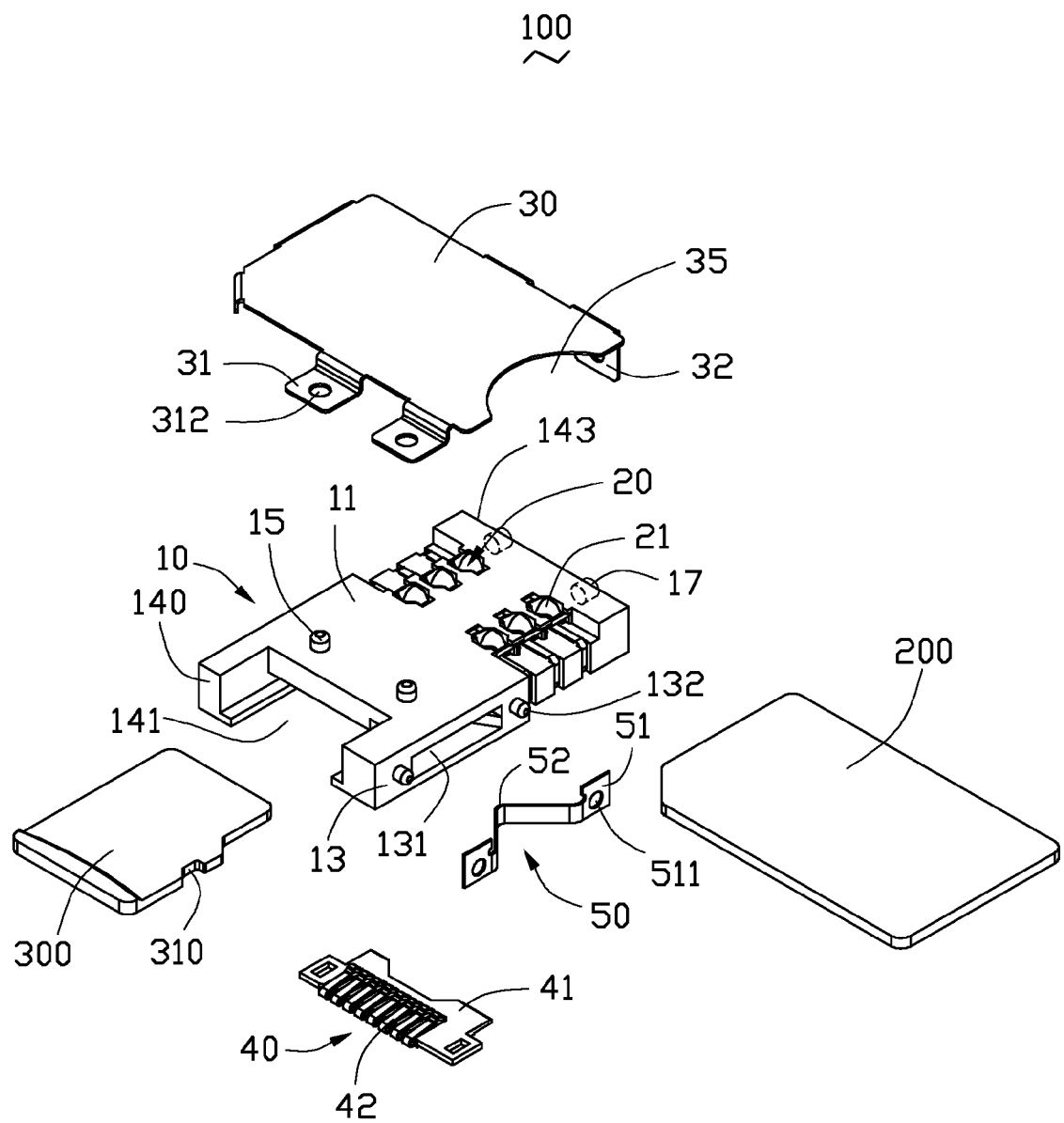
FIG. 1 is an exploded view of an exemplary embodiment of a smart card securing mechanism.
Figure 2:
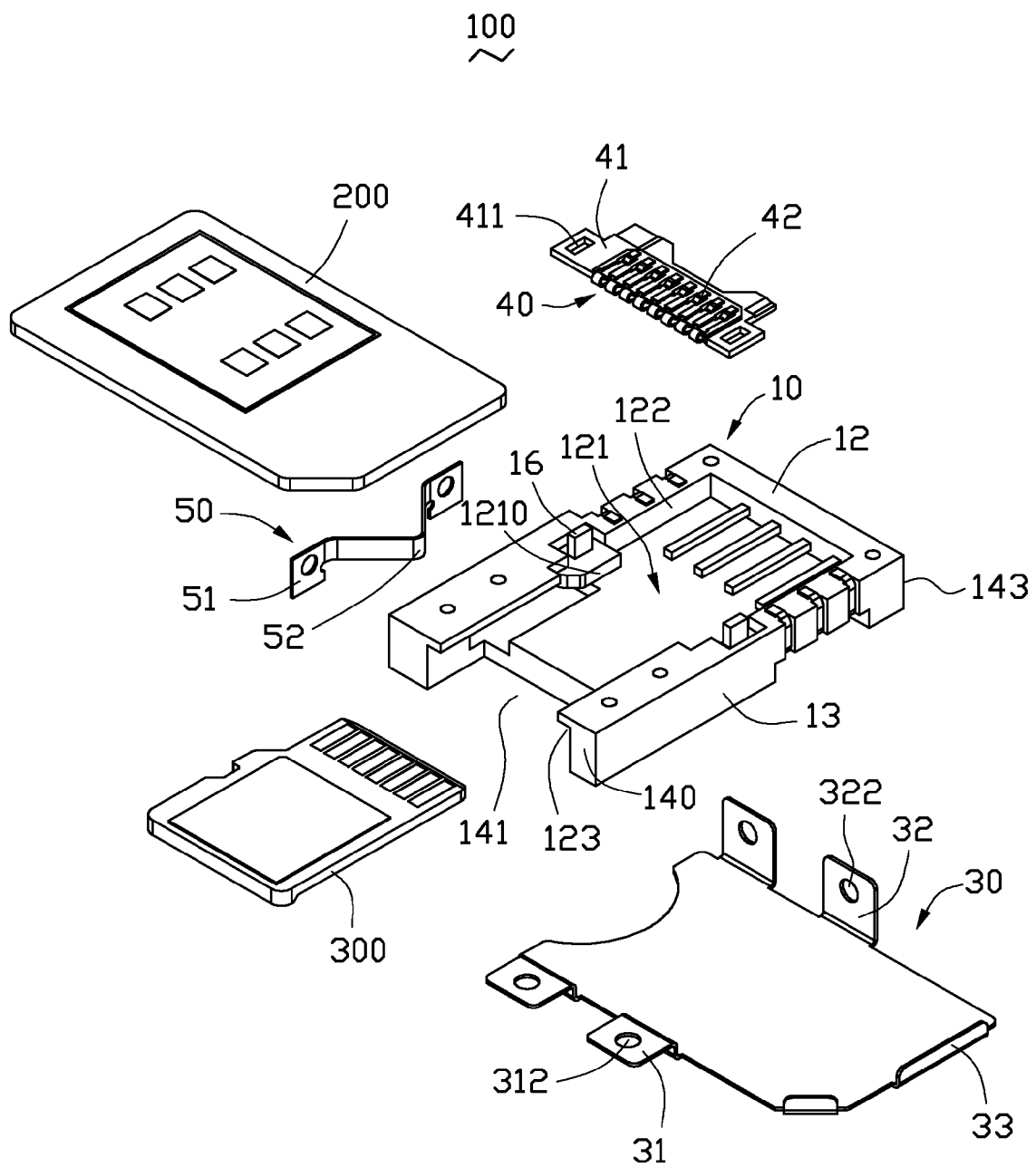
FIG. 2 is similar to FIG. 1, but shown from another aspect.
Figure 3:
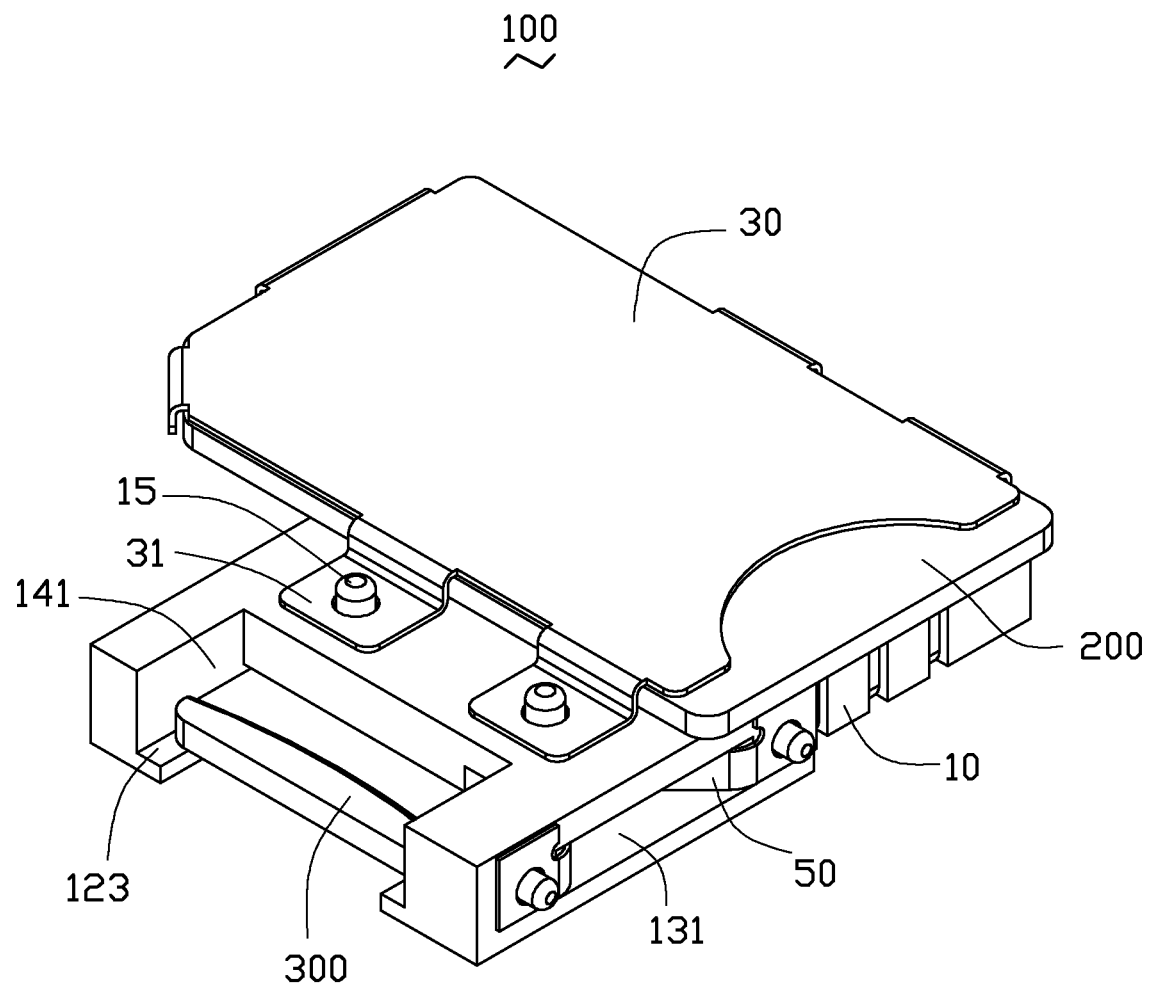
FIG. 3 is an assembled view of the smart card securing mechanism shown in FIG. 1.

FIGS. 1-4 show a smart card securing mechanism 100 used for securing two smart cards in an electronic device, such as a mobile phone. One of the smart cards is a subscriber identity module (SIM) card 200, and the other is a memory card 300. The SIM card 200 and the memory card 300 can be received and secured in the smart card securing mechanism 100.

The smart card securing mechanism 100 includes a base 10, a first latching member 30, a second latching member 40, and an elastic sheet 50. The base 10 can be a portion of a housing of the electronic device.

The base 10 includes a first surface 11, a second surface 12, opposite sidewalls 13, a first end 140, and a second end 143. The first surface 11 is opposite to the second surface 12 and includes a first connector 20 configured for electronically connecting the SIM card 200. The first latching member 30 is mounted to the first surface 11 for latching the SIM card 200. Two first posts 15 are formed on the first surface 11, and two second posts 17 are formed on the second end 143. The second surface 12 defines a receiving groove 121 forming two opposite sidewalls 122. Each sidewall 122 defines a guiding groove 123 and forms an extending plate 1210. The first end 140 defines a cutout 141 communicating with the guiding grooves 123. The guiding grooves 123 are for slidably receiving the memory card 300. A latching projection 16 for fixing the second latching member 40 is formed on each extending plate 1210. One of the sidewalls 13 defines a receiving slot 131 for receiving the elastic sheet 50. The receiving slot 131 communicates with the corresponding guiding groove 123. Two pins 132 are formed at opposite ends of the receiving slot 131.

The first latching member 30 is a cover plate configured for being mounted to the first surface 11 of the base 10 and receiving the SIM card 200. The first latching member 30 has two first tabs 31 extending from a first side of the first latching member 30, and two second tabs 32 extending from a second side of the first latching member 30 opposite to the first side. The first tabs 31 are substantially parallel to the first latching member 30 and are each connected to the first latching member 30 by a connecting portion extending substantially perpendicularly from an edge of the first side of the latching member 30. Each first tab 31 defines a post hole 312. The second tabs 32 extend substantially perpendicularly from the second side of the first latching member 30. Each second tab 32 defines a post hole 322. The post holes 312, 322 are for receiving the posts 15, 17, respectively. At least one stopper edge 33 extends substantially perpendicularly from one end of the first latching member 30 for abutting one end of the SIM card 200. Another end of the first latching member 30 defines a cutout 35 for exposing one portion of the SIM card 200 from the first latching member 30.

Figure 4:
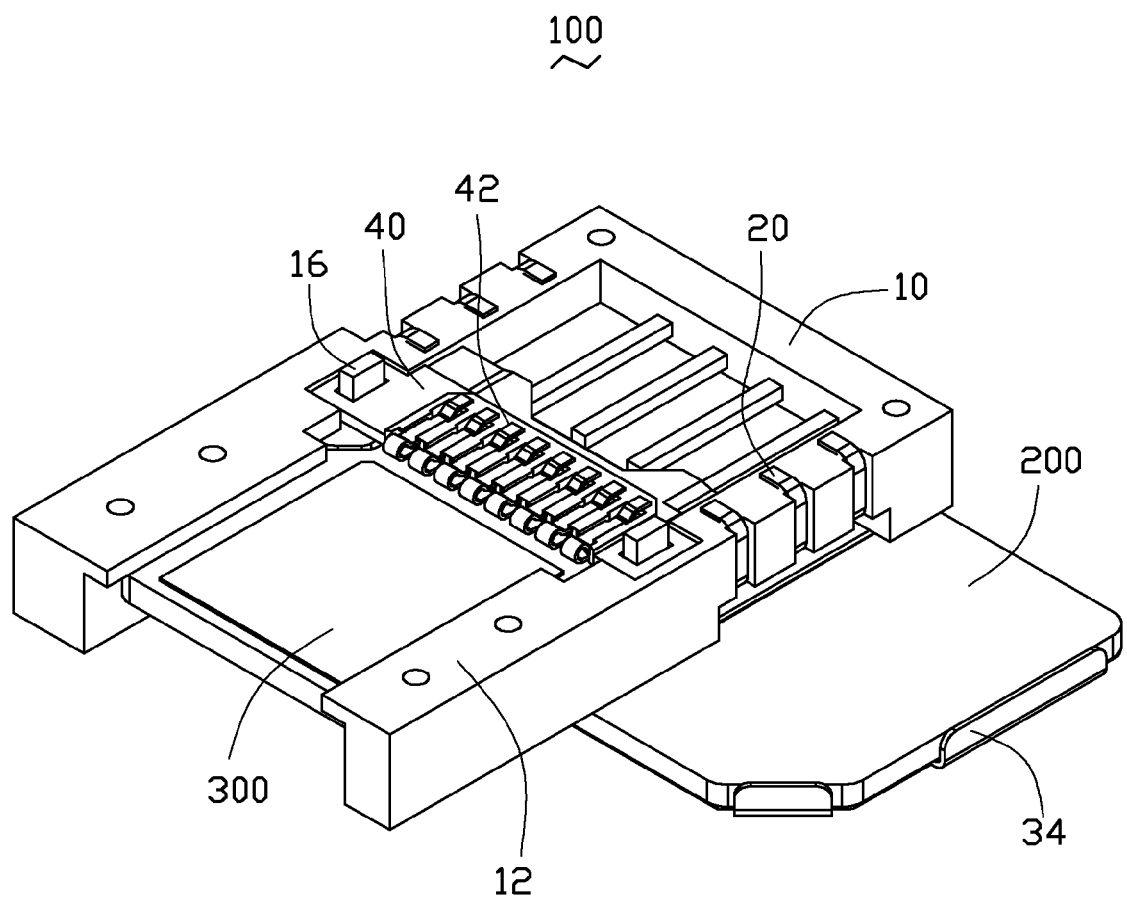
FIG. 4 is similar to FIG. 3, but shown from another aspect.

Referring to FIG. 4, the second latching member 40 is configured for being mounted to the second surface 12 of the base 10 for receiving the memory card 300. The second latching member 40 includes a plate portion 41 and a second connector 42. Two latching holes 411 are defined in opposite ends of the plate portion 41, respectively. The projections 16 are latched in the latching holes 411 for mounting the second latching member 40 to the base 10.

The elastic sheet 50 is received in the receiving slot 131 for abutting against one side of the memory card 300. In the exemplary embodiment, the elastic sheet 50 is substantially V-shaped. The elastic sheet 50 includes two mounting ends 51 and a resisting projection 52. Each mounting end 51 defines a pin hole 511 for receiving a corresponding pin 132.

The assembly process of the smart card securing mechanism 100 is as follows: The first latching member 30 is positioned on the first surface 11 of the base 10, such that the first posts 15 and the second posts 17 are received through the first tabs 31 and the second tabs 32. Then, the first posts 15 and the second posts 17 are fixed to the first tabs 31 and the second tabs 32 by heat-melting. Thus, the first latching member 30 is mounted on the base 10. Next, the second latching member 40 is positioned on the second surface 12, such that the projections 16 of the base 10 are latched in the two latching holes 411 of the plate portion 41. Thus, the second latching member 40 is mounted to the base 10. The SIM card 200 is received in a space defined between the first latching member 30 and the base 10 to be electronically connected to the first connector 20. The memory card 300 is received in a space defined between the second latching member 40 and the base 10, and is slidably received in the guiding grooves 123 through the cutout 141. The resisting projection 52 of the elastic sheet 50 abuts one side of the memory card 300, and the memory card 300 is electronically connected to the second connector 42. Thus, the SIM card 200 and the memory card 300 are mounted to the base 10.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in the matters of shape, size, and arrangement of parts within the principles of exemplary disclosure to the full extent indicated by the broad general meaning of the terms in which the appended claims are expressed.

What is claimed is:

1. A smart card securing mechanism for securing a first smart card and a second smart card, the smart card securing mechanism comprising:
a base including a first connector;
a first latching member positioned on one side of the base;
a second latching member including a second connector and positioned on another side of the base; and
an elastic sheet mounted to the base;
wherein the first smart card is positioned between the base and the first latching member, the second smart card is positioned between the base and the second latching member, and the elastic sheet abuts against the second smart card; the base defines two guiding grooves and forms two extending plates, the guiding grooves slidably receive the second smart card, and a latching projection is formed on each extending plate for fixing the second latching member.

2. The smart card securing mechanism as claimed in claim 1, wherein the base defines a receiving slot for receiving the elastic sheet, and the elastic sheet is substantially V-shaped.

3. The smart card securing mechanism as claimed in claim 2, wherein the elastic sheet includes two mounting ends and a resisting projection, the mounting ends are mounted to the base, and the resisting projection abuts against the second smart card.

4. The smart card securing mechanism as claimed in claim 1, wherein the base includes two first posts and two second posts, the first latching member has two first tabs and two second tabs respectively engaging with the two first posts and the second posts.

5. The smart card securing mechanism as claimed in claim 1, wherein at least one stopper edge extends from one end of the first latching member for abutting one end of the first smart card, another end of the first latching member defines a cutout to expose one portion of the first smart card.

6. An electronic device, comprising:
a base including a first surface, a second surface and opposite sidewalls;
a first latching member mounted to the first surface of the base;
a second latching member mounted to the second surface of the base; and
an elastic sheet mounted to one of the opposite sidewalls of the base;
wherein a first receiving cavity is defined between the base and the first latching member configured for receiving a first smart card, a second receiving cavity is defined between the base and the second latching member configured for receiving a second smart card, and the elastic sheet abuts against the second smart card;
wherein the base includes two first posts and two second posts, the first latching member has two first tabs and two second tabs engaging with the two first posts and the second posts;
wherein the base defines two guiding grooves and has forms two extending plates, the guiding grooves slidably receive the second smart card, a projection is formed on each extending plate for fixing the second latching member.

7. The electronic device as claimed in claim 6, wherein at least one stopper edge extends from one end of the first latching member for abutting one end of the first smart card, another end of the first latching member defines a cutout to expose one portion of the first smart card.

8. The electronic device as claimed in claim 6, wherein the base defines a receiving slot for receiving the elastic sheet, and the elastic sheet is substantially V-shaped.

9. The electronic device as claimed in claim 8, wherein the elastic sheet includes two mounting ends and a resisting end, the mounting ends are mounted to the base, and the resisting end abuts against the second smart card.

* * * * *